(12) United States Patent
Norcott (10) Patent No.: US 7,111,023 B2
(45) Date of Patent: Sep. 19, 2006

(54) SYNCHRONOUS CHANGE DATA CAPTURE IN A RELATIONAL DATABASE

(75) Inventor: William D. Norcott, Nashua, NH (US)

(73) Assignee: Oracle International Corporation, Redwood Shores, CA (US)

( * ) Notice: Subject to any disclaimer, the term of this patent is extended or adjusted under 35 U.S.C. 154(b) by 879 days.

(21) Appl. No.: 09/863,422

(22) Filed: May 24, 2001

(65) Prior Publication Data

US 2003/0172091 A1   Sep. 11, 2003

(51) Int. Cl.
G06F 17/30 (2006.01)
(52) U.S. Cl. .......................... 707/203; 707/1; 707/101
(58) Field of Classification Search ............. 707/1–10, 707/100–104.1, 200–205
See application file for complete search history.

(56) References Cited

U.S. PATENT DOCUMENTS

| 5,280,612 | A | * | 1/1994 | Lorie et al. ..................... 707/8 |
| 5,553,279 | A | * | 9/1996 | Goldring .................... 707/201 |
| 5,613,113 | A | | 3/1997 | Goldring |
| 5,848,405 | A | | 12/1998 | Norcott |
| 5,926,819 | A | | 7/1999 | Doo et al. |
| 5,963,959 | A | | 10/1999 | Sun et al. |
| 6,125,360 | A | | 9/2000 | Witkowski et al. |
| 6,438,538 | B1 | | 8/2002 | Goldring |
| 2003/0172091 | A1 | | 9/2003 | Norcott |

FOREIGN PATENT DOCUMENTS

| WO | WO/02/095632 A2 | 11/2002 |
| WO | WO/03/096227 A2 | 11/2003 |

OTHER PUBLICATIONS

U.S. Appl. No. 09/863,419, filed May 24, 2001, Norcott.
U.S. Appl. No. 10/140,818, filed May 9, 2002, Norcott et al.
Bello R G et al; "Materialized views in Oracle"; Proceedings of the Twenty-Fourth International Conference on Very-Large Databases; New York, NY; Aug. 24-27, 1998; pp. 659-664; Kaufmann Publishers Inc; USA.
Chaudhuri S et al; "An Overview of Data Warehousing and OLAP Technology"; Mar. 1997; pp. 65-74; vol. 26, No. 1; Sigmond Record; New York, NY; USA.

* cited by examiner

Primary Examiner—Mohammad Ali
(74) Attorney, Agent, or Firm—Bingham McCutchen LLP (57) ABSTRACT

A synchronous change data capture system and methodology are described in which, for each statement of a transaction, a transaction identifier that uniquely identifies each transaction is recorded along with the change data. When the transaction is committed, the transaction identifier and a system change number for the commit is recorded in a transaction table. To identify the commit system change number for each statement in the change data, the transaction identifier in the change data is used to fetch the commit system change number from the transaction table.

14 Claims, 4 Drawing Sheets

SYNCHRONOUS CHANGE DATA CAPTURE IN A RELATIONAL DATABASE

RELATED APPLICATIONS

The present application is related to U.S. patent application Ser. No. 10/140,818 entitled "Method and Apparatus for Change Data Capture in a Database System" filed on May 9, 2002 by William D. Norcott et al.

The present application is related to U.S. patent application Ser. No. 09/863,491 entitled "Asynchronous Change Capture for Data Warehousing" filed on May 24, 2001 by William D. Norcott, the contents of which are hereby incorporated by reference.

FIELD OF THE INVENTION

The present invention relates to database systems and more particularly to a method and apparatus for synchronous change data capture in a database system.

BACKGROUND OF THE INVENTION

Many businesses and other large organizations today use relational database management systems known as on-line transaction processing (OLTP) systems to execute and keep track of business transactions. For example, a company that sells products or services over the Internet may use an OLTP system to record pricing information about each product for sale, billing and shipping information for each purchaser, and sales information for each order made by a purchaser. Other examples of businesses that use OLTP systems include airlines, banks, mail-order companies, supermarkets, and manufacturers.

The data generated and recorded in OLTP systems are valuable to most businesses, because the businesses can aggregate and analyze the data to ascertain the product sales for a particular month, forecast changing trends in product popularity and identify profitable or unprofitable product lines, or otherwise evaluate the businesses' affairs. Aggregating and analyzing this data, however, is computationally expensive and, if performed on the OLTP system itself, would decrease the performance of the OLTP system. Accordingly, it has become common for businesses with OLTP systems to set up a separate computer system, generally known as a "data warehouse," for the purpose of collecting, aggregating, and analyzing the information contained in the OLTP databases. Data warehouses can grow very large, ranging from gigabytes to many terabytes of data (trillions of bytes). The task of moving data from its original source in OLTP systems to the data warehouse is commonly referred to as data extraction, transport, and loading (ETL).

Synchronous change data capture is one approach for data extraction, transport, and loading, in which the changes are captured in the very same transaction that is updating the tables on the OLTP system. Thus, as new data arrives in the data warehouse, the changes made to one or more tables on the OLTP system are captured synchronously and stored in corresponding change tables in the data warehouse, such that for every table that is updated on the OLTP system, there is a corresponding change table that contains those changes.

For each transaction in a relational database management system, there is a unique system change number (SCN) that is associated with each modification made to a table in the relational database management system. Typically, each modification is characterized by an individual Data Manipulation Language (DML) statement such as an INSERT, UPDATE, or DELETE statement in the SQL language. The system change number is a monotonically increasing serial number, so that each new DML statement is assigned a new system change number that is greater than any system change number that has been assigned beforehand. A transaction may comprise a plurality of DML statements each having a corresponding system change number. Moreover, when the transaction commits there is a final system change number, referred to here as the "commit system change number" (CSCN) that applies to the transaction as a whole. In a relational database management system, changes to the contents of the database are actually applied at commit time; thus, the CSCN stands for all the DML operations that have occurred in that transaction. Moreover, if the change table were to record the CSCN for each change, then it would be possible to determine the precise order in which changes occurred on the relational database management system. An application could then use the change table to segregate the changes that happened within a particular transaction, and moreover to view each change in the order that it committed in the relational database management system.

Conventional systems have used triggers for synchronous change data capture, either by using the CREATE TRIGGER statement or by using an internal mechanism with equivalent functionality. A trigger is an object that specifies a series of actions to be automatically performed when a specific event occurs, and, according to industry standards, the events that cause triggers to be activated (or "fired") are DML statements. For synchronous change data capture, triggers have been designed to fire when a row of a database table is updated, inserted, or deleted. Each of these modifications is associated with its own system change number (SCN), which is recorded by the trigger. The true commit system change number (CSCN) for the transaction cannot be recorded at this time because the commit has not yet occurred. Thus, existing trigger-based mechanisms do not capture the CSCN, which is a serious technical flaw that greatly limits their usefulness. Without the CSCN for each record, it is not possible to identify changes that occurred within a particular transaction nor to consider the effects of each transaction in turn, in the precise order in which the changes were committed to the relational database management system.

For example, suppose there is a plurality of users on the OLTP system, and the OLTP system assigns system change numbers for each statement executed by the users. Suppose further that user X begins transaction X at SCN 1 and commits transaction X at SCN 20. However, suppose transaction Y is begun by another user at SCN 16 and commits at CSCN of 18. This example illustrates that the assignment of system change numbers is shared across all transactions. Therefore, a given transaction X is not guaranteed to have an exclusive, unbroken range of system change numbers, not allocated to any other transaction; in fact, the opposite is usually true. Even though transaction X started first, transaction Y in fact committed first. Insofar as the data integrity of the relational database management system is concerned, and specifically with respect to the change table, transaction Y is considered to have occurred prior to transaction X because transaction Y committed before transaction X, despite the fact that the first statement of transaction X had an earlier system change number than the first statement of transaction Y.

Thus, prior attempts at synchronous change capture have not been transactionally consistent due to their failure to record the CSCN. These attempts have, at best, been able to implement a partial ordering of the changes based on the system change numbers of the individual statements and to consider changes in the approximate order in which they occurred. To use the change data there was often a costly post-processing phase that requires each and every row of the change table to be updated, so that a partial ordering could be applied to the changes. This requirement for post-processing greatly limits the practical size of a change table, in as much as each row would have to be updated in order to apply a partial transaction ordering.

Therefore, there is a need for a synchronous change data capture system that can be transactionally consistent without a costly post-processing phase.

SUMMARY OF THE INVENTION

These and other needs are addressed by the present invention by recording, for each statement in the change data, a transaction identifier that uniquely identifies each transaction. When the transaction is committed, the transaction identifier and a system change number for the commit is recorded in a transaction table. To identify the commit system change number for each statement in the change data, the transaction identifier in the change data is used to fetch the commit system change number from the transaction table.

Accordingly, one aspect of the present invention involves a method for synchronous change data capture, in which a transaction identifier is generated that uniquely identifies a transaction. For each operation in a transaction, change data for the operation and the transaction identifier is recorded in a first database object (e.g. a change table). During a commit of the transaction, the transaction identifier and a system change number is recorded in a second database table (e.g. a transaction table). An identifier to identify a relative ordering of each operation in the transaction can also be recorded in the first database object.

In one implementation, the system change number recorded during the commit is generated after obtaining a concurrency lock, which prevents other processes from generating new system change numbers. After recording the transaction identifier and the system change number in the second database object, the concurrency lock is released.

Another aspect of the present invention pertains to a method and software for processing synchronously captured change data. In this aspect, a first database object is accessed that contains change data for an operation performed within a transaction and a transaction identifier that uniquely identifies the transaction. A second database object is also accessed that contains the transaction identifier and a system change number. The change data in the first database object is then associated with the system change number in the second database object based on the transaction identifier, for example by a database join operation.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF THE PREFERRED EMBODIMENT

A system, method, and software for synchronous change data capture are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

In a database management system, data is stored in one or more data containers, each container contains records, and the data within each record is organized into one or more fields. In relational database systems, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

Systems that implement the present invention are not limited to any particular type of data container or database architecture. However, for the purpose of explanation, the terminology and examples used herein shall be that typically associated with relational databases. Thus, the terms "table," "row," and "column" shall be used herein to refer respectively to the data container, record, and field.

Architectural Overview

Figure 1:
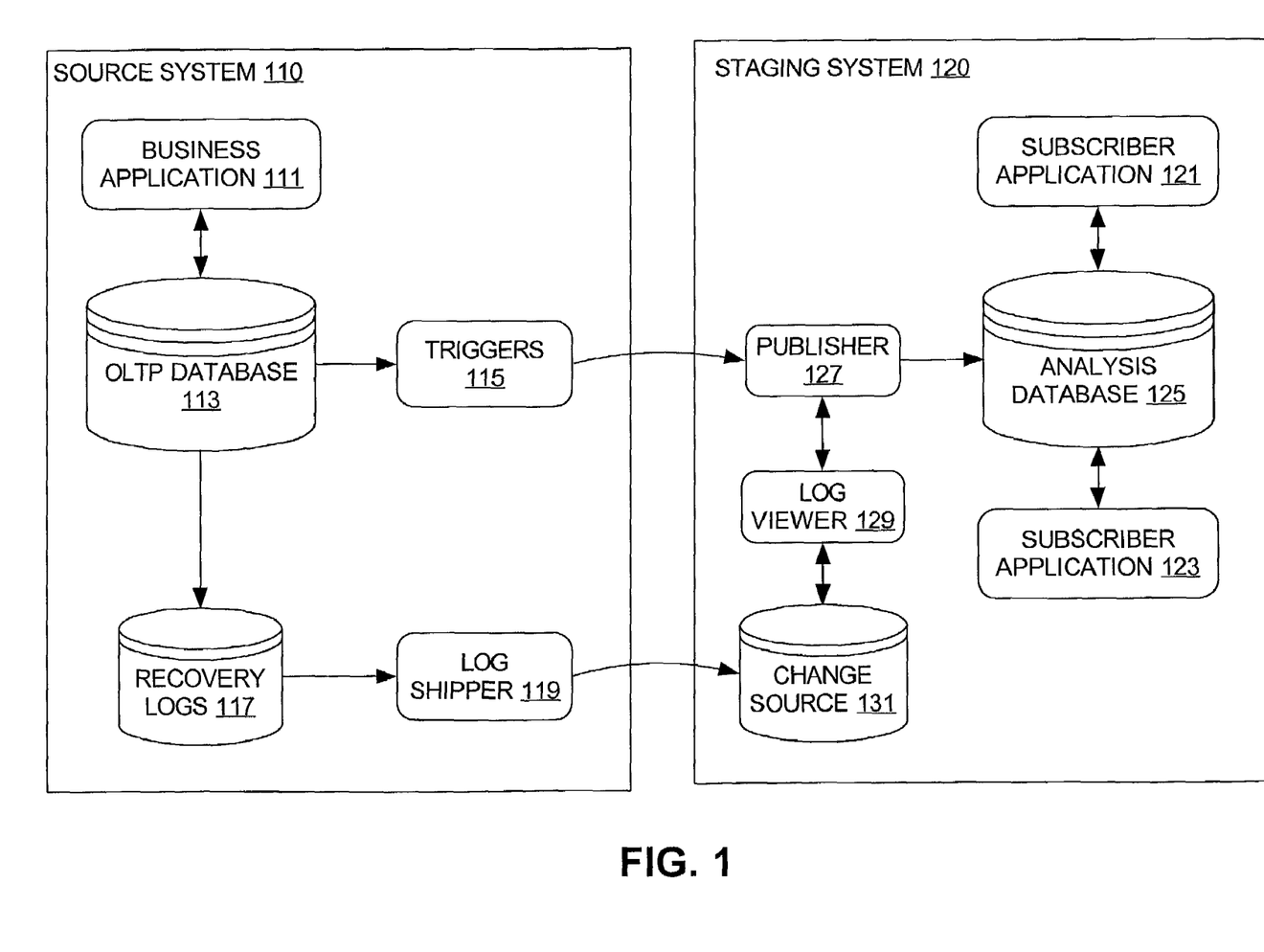
FIG. 1 is a high-level architectural diagram of one embodiment of the present invention.

FIG. 1 depicts the architecture of one embodiment of the present invention comprising a source system 110 and a staging system 120. The source system 110 is typically an on-line transaction processing (OLTP) for executing and keeping track of transactions for a business. For example, the source system 110 hosts a business application 111 that is responsible for interacting with employees or customers of the business. In response to commands and queries from the user of the business application 111, the business application 111 interacts with an OLTP database 113 for storing and retrieving data.

Functioning as the data warehouse in this example, the staging system 120 hosts one or more subscriber applications 121, 123. Without loss of generality, two subscriber applications 121, 123 are depicted, although any number may be created during the course of operation of an embodiment of the present invention. The subscriber applications 121, 123 are responsible for aggregating and analyzing the change data that has been extracted from the OLTP database 113, transported to the staging system 120, and loaded into the analysis database 125.

Triggers 115 are employed to implement a synchronous change data capture mechanism. A trigger may be created, for example, using the SQL statement "CREATE TRIGGER TR1 AFTER INSERT OR UPDATE OR DELETE ON ST1", which means that, whenever any SQL INSERT, UPDATE or DELETE statement is performed on table ST1, the trigger "fires" or become active, invoking an action routine. When the trigger fires the action routine receives the rows that were inserted, updated, or deleted. Alternatively, an internal trigger mechanism may be employed that is similar in function to the CREATE TRIGGER statement but is more efficient and provides the action routine with more information. One implementation of an internal trigger mechanism is described in greater detail in the commonly assigned U.S. Pat. No. 5,926,819 entitled "In-Line Triggers" issued Jul. 20, 1999 to Lip Boon Doo et al., the contents of which are hereby incorporated by reference.

Triggers 155 thus capture each change to the OLTP database 113, synchronously, when the changes are made, and transport the changes to the staging system 120. At the staging system 120, these changes are then integrated and loaded into change tables (not shown) of the analysis database 125 by a publisher process 127. The synchronous extraction mechanism is described in greater detail in below.

An asynchronous extraction mechanism may also be employed, in which a log shipper 119 periodically copies recovery logs 117 that are produced by the OLTP database 113 in the normal course of operation. The recovery logs 117 contain all the changes that have been applied to the OLTP database 113 and are used for backing up the data in the OLTP database 113 and restoring the data in case of a system crash. The log shipper 119 copies the recovery logs 117 to an area of the staging system 120 called a change source 131, which can be implemented as an operating system directory. The publisher 127 interacts with a log viewer process 129 to obtain the change data from the shipped recovery logs in the change source 129 without having to be aware of the internal implementation details of the recovery logs. The publisher 127 then loads the change data obtained via the log viewer process 129 into the change tables in the analysis database 125. The asynchronous extraction mechanism is described in greater detail in the commonly assigned, co-pending U.S. patent application Ser. No. 09/863,491 entitled "Asynchronous Change Capture for Data Warehousing" filed on May 24, 2001 by William D. Norcott, the contents of which are hereby incorporated by reference.

Objects for Managing Change Data

Figure 2:
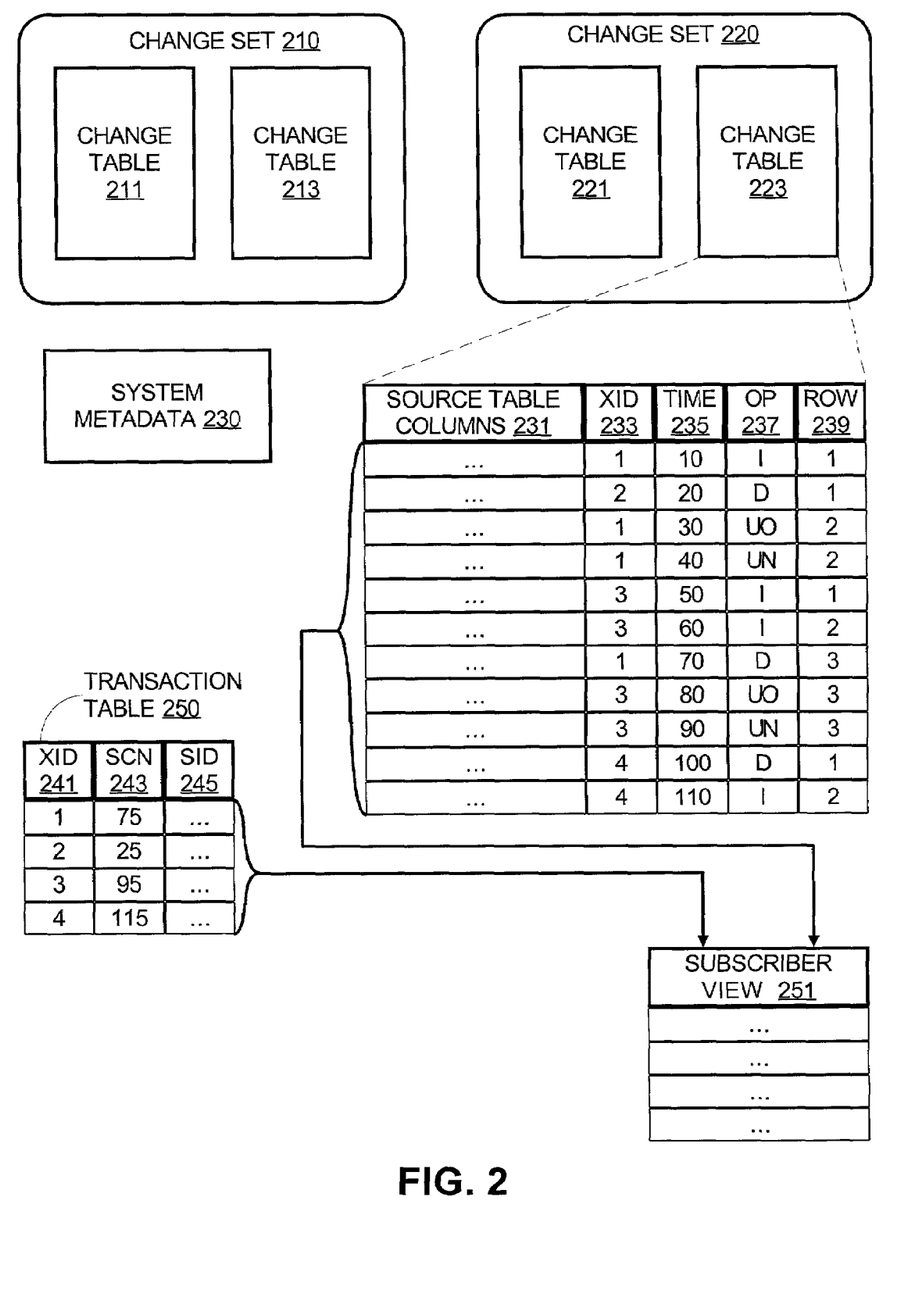
FIG. 2 is a schematic diagram depicting change objects in accordance with one embodiment of the present invention.

In accordance with one aspect of the present invention, the change data extracted from the OLTP database 113 is maintained in one or more database objects, referred to herein as "change tables" and "transaction tables" under control of a database management system, e.g. analysis database 123. Referring to FIG. 2 by way of example, each source table or database object on the OLTP database 113 that is subject to change data capture is associated with a corresponding change table 211, 213, 221, 223 in the analysis database 125. For transactional consistency, change tables 211, 213, 221, 223 are grouped into sets of one or more "change sets" 210, 220 such that the publisher 127 ensures that all new change data added to the change tables in the same change set (e.g. change tables 211, 213 of change set 210) are added at the same time, e.g. the modifications to these change tables are performed in the same transaction and committed. In the example depicted in FIG. 2, there are two change sets, change set 210 and change set 220. Change set 210 comprises change table 211 and change table 213, which correspond to respective tables (not shown) on the OLTP database 113. Likewise, change set 220 comprises change table 221 and change table 223, which also correspond to respective tables (not shown) on the OLTP database 113. The information that defines the structure of the change sets 210, 220 and change tables 211, 213, 221, 223 is maintained in system metadata 230.

Each change table employs a number of control columns in addition to the source table columns whose values were extracted, transported, and loaded from columns of the corresponding source table in the OLTP database 113. In the example of FIG. 2, change table 223 is depicted as having a set of source table columns 231 and control columns XID 233, TIME 235, OP 237, and ROW 239. The source table columns 231 may include all or a subset of the columns in the corresponding source table. In various implementations, the control columns may be part of the same database object that contains the source table columns or part of a parallel, associated database object, which can be joined with source table columns (e.g. by a row identifier or a primary key).

The control columns XID 233, TIME 235, OP 237, and ROW 239 preferably have reserved names that customers are not allowed to use for their own columns, for example, names with a reserved character such as a dollar sign ($). The reserved names, of course, can be any valid string and, in this example, are named XID 233, TIME 235, OP 237, and ROW 239 for mnemonic reasons. The XID 233 column holds a transaction identifier, which can be a monotonically increasing number that uniquely identifies each transaction on the OLTP database 113 that gave rise to the change data.

In one embodiment, for example, the transaction identifier 233 has the following properties: (a) each transaction identifier is greater than all preceding transaction identifiers; (b) all DML operations (insert, update, delete, etc.) that belong to same transaction have the same value for the transaction identifier; (c) the SQL "commit" statement that is used to finalize the transaction is also assigned the same value of the transaction identifier; and (d) no SQL statement that is not part of the transaction has the same value for the transaction identifier.

The TIME 235 column contains the commit time of the transaction that gave rise to the change data. This column helps subscriber applications 121 select or view change data that occurs in particular periods of time.

The OP 237 column contains a code indicating the type of operation that resulted in the change data. For example, if the OP 237 column contains the symbol 'I', then the operation was an insert operation and the change data in the source table columns 231 contains the data that was inserted. If the OP 237 column contains the symbol 'D', then the operation was a delete operation and the change data in the source table columns 231 contains the data that was deleted (this allows the summaries to be properly readjusted by the subscriber applications 121). If the OP 237 column contains the symbol 'UO', then the operation was an update operation and the change data in the source table columns 231 contains the old data that was modified; likewise, if the OP 237 column contains the symbol 'UN', then the operation was an update operation and the change data in the source table columns 231 contains the new data that was modified. Thus, update operations on the source table result in two entries in the change table, one for the old data and another for the new data, so the subscriber applications 121 have sufficient information to readjust their summaries of the OLTP data. Under certain circumstances, the source table may include "large objects" (LOB) such as graphics and pictures. This LOB is typically not summarized, so, to save memory, only the new LOB is recorded in the change table (with the symbol 'UL' in the OP 237 column). These symbols in the OP 237 column ('I', 'D', 'UO', 'UN', 'UL') are chosen for mnemonic reasons and other symbols can be arbitrarily assigned any unique value without departing from the purview of the present invention (e.g. numbers).

The ROW 239 column contains a unique row sequence number for the changes in the change table. In particular, each SQL statement or operation that is part of the same transaction has a value of the row sequence number that is greater than any preceding operation in the same transaction. This column helps subscriber applications 121 order the operations that have been committed in the same transaction, because relational database management systems are free to store the operations in any order. Also, both the record for the old updated values (OP 237 column with 'UO') and the record for the new updated values (OP 237 column with 'UN') of the same operation will have the same row sequence number, because these two records are for the same change operation on the OLTP database 113 (an update operation).

Although not depicted in FIG. 2, additional control columns may be provided to facilitate the implementation of embodiments of the present invention. For example, a bit mask of the updated columns can be used to identify quickly which columns have changed. As another example, the name of a user who causes the operation can be recorded in a control column. The row identifier of the affected row in the source table can also be included in a control column.

In addition, a separate transaction table 250 is provided to record the transaction identifiers 241 of committed transactions and the system change number 243 that is associated with the transaction commit. A session identifier 245 may also be provided to identify the current database session, differentiating among all current users of the relational database management system. The transaction table 250 may be configured to be a system-wide table that is applicable to all users.

Synchronous Change Data Capture

Figure 3:
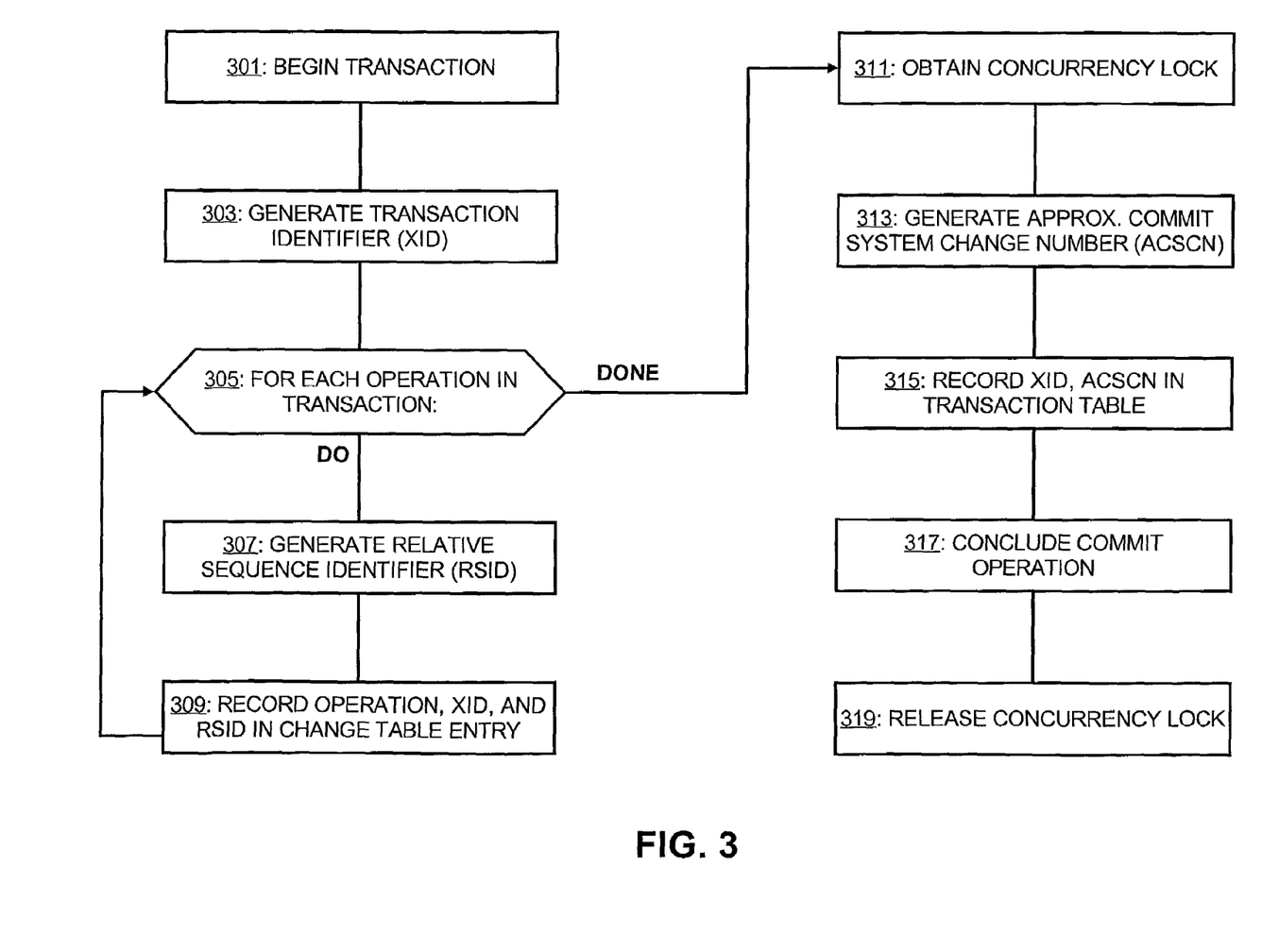
FIG. 3 is a flowchart that illustrates a synchronous change data capture for an embodiment of the present invention.

FIG. 3 is a flowchart that illustrates the operation of one embodiment of the present invention. At step 301, a user begins a transaction in which one or more operations (e.g. SQL or DML statements) are to be performed. At step 303, a unique transaction identifier is generated to identify the operations in the change table 223 that belong to the same transaction.

For each operation in the transaction (controlled at step 305), the relative sequence identifier is generated (step 307) and recorded in the change table 223 along with the transaction identifier, an indicator of the kind of operation (e.g. update, insert, delete), the change data for the operation. The change data may comprise, for example, the values of all columns that have changed in the source table, including, in the case of an update operation, both the new and old values of any columns that were updated. In this embodiment, the system change number for the operation need not be directed in the change table itself.

After all operations in the transaction have been performed, the system is ready to commit the transaction, whereby execution branches from step 305 to step 311. Although steps 305, 307, 309 are depicted as a loop in FIG. 3, it is to be understood that other control structures may be used, including simple sequencing in which all of the operations in the transaction have been unrolled or merely juxtaposed in a sequential order.

Steps 311, 313, 315, 317, 319 constitute a critical section that contains a part of the processing of the transaction's commit statement for which it is desirable to enforce mutual exclusion. To save time for those transactions that are not set up to be captured, the transaction properties may be checked to determined if changes should be captured in the first place. If changes need not be captured, then steps 311, 313, 315, 319 are skipped.

At step 311, preferably as late as possible into the commit processing, e.g. after the last DML operation, a concurrency lock is obtained to protect the mutual exclusion section and prevent other user processes from processing steps 311, 313, 315, 317, 319 at the same time. Various forms of concurrency controls may be implemented, and the present invention is not limited to any one particular implementation, such as the use of a semaphore.

At step 313, a system change number for the current statement is allocated for use as an approximate commit system change number ACSCN. The approximate commit system change number is less than the true commit SCN that is about to be generated later in the commit-at a point where it is too late to make use of it. Because the approximate commit it system change number (ACSCN) is obtained under a concurrency lock, no change data capture operation in any other transaction is permitted to allocate a system change number as long as the concurrency lock is being held. Thus, the approximate commit system change number constitutes a reliable proxy for the true commit SCN.

At step 315, a row is inserted into the transaction table containing the following columns: (a) the transaction identifier 241, (b) the approximate commit system change number 243, and (c) the session identifier 245 of the current session. Every row of every change table also records the transaction identifier 233 for that transaction; thus, the transaction identifier is recorded in two places: in the change table itself as transaction identifier 233, and in the transaction table as transaction identifier 241.

The remainder of the commit operation is then processed in step 317, in which the true commit system change number is generated and the statement commits. The insert of the additional row into the transaction table is also committed at this time. Finally, at step 319, the concurrency lock is released, ending the mutual exclusion section and permitting other processes to generate system change numbers.

Accordingly, the transaction table 250 maintains a row for each transaction that was captured synchronously (identified by the transaction identifier 241), and the transaction table maintains records of the true order in which all transactions committed (as determined by the approximate commit system change number 243). In terms of performance, it has been found that the worst-case overhead of capturing the commit system change number in a transaction table 250 is about /3;4 of 1% of the overhead (0.0075) as opposed to not doing so, and that in the typical case the overhead is less than /1;4 of 1% (0.0025). Therefore, for all practical purposes the overhead of applying this method is negligible. However, the benefits of doing so are great and provide the capability of true transaction order that are not found in prior art.

SELECTING THE DATA IN TRANSACTION ORDER

In the embodiment of the present invention described herein above, both the change data and the commit SCN for each and every transaction that was captured have been recorded in the change tables 211, 213, 221, 223 and transaction table 250, respectively. To obtain the contents of the change table 223 in the order in which the operation originally occurred, a database join operation between the change table 223 and the transaction table 250 can be used. For example, one implementation of the present invention may use the following SQL join operation, in which change table 223 has source table columns 231 named C1, C2, and C3:

SELECT TT.CSCN CSCN, CT1.RSID, CT1.C1 C1, CT1.C2 C2, CT1.C3 C3
FROM TT, CT1
WHERE TT.XID =CT1.XID
ORDER BY CSCN

This statement relies on the fact that all SQL statements within a given transaction have the same value for a transaction identifier and that this value was stored in the transaction table 250 in the same row as the commit system change number 243. Therefore a join across the two tables matches up all SQL statements belonging to a particular transaction with their associated commit system change number 243. Moreover, the SQL ORDER BY clause returns the change rows in increasing sorted order, according to their commit system change number, which is to say, in the original order in which the transactions committed.

Moreover, the end user or the subscriber application 121 need not be aware of the fact that there is a join between the change table (that does not contain the commit system change number), and the transaction table (that contains the commit system change number and little else). The feature may be attained by providing a subscriber view 251, generated on behalf of each user of the change data. In the above example, the corresponding subscriber view 251, named CV1 can be created with the following construct:

CREATE VIEW CV1 (CSCN, RSID, A, B, C) AS
SELECT TT.CSCN CSCN, CT1.RSID, CT1. C1 C1, CT1. C2 C2, CT1. C3 C3
FROM TT, CT1
WHERE TT.XID=CT1.XID

With this subscriber view 251, the subscriber application need only execute the following simple SQL query:
SELECT*FROM CV1 ORDER BY CSCN This select query returns all change rows for a transaction in the precise and correct order in which the transactions were committed to the relational database management system. Moreover, an additional level of order is possible such that not only the changes are arranged according to commit order, but the various operation within a transaction can be sub-ordered, as in the following query:
SELECT*FROM CV1 ORDER BY CSCN, RSID Furthermore, the contents of both the synchronous change tables and the transaction tables can be purged so that they do not grow without limit, because the use of the join identifies all rows of the change tables that would need to be purged, after which the corresponding row or rows from the transaction table itself may be purged.

Hardware Overview

Figure 4:
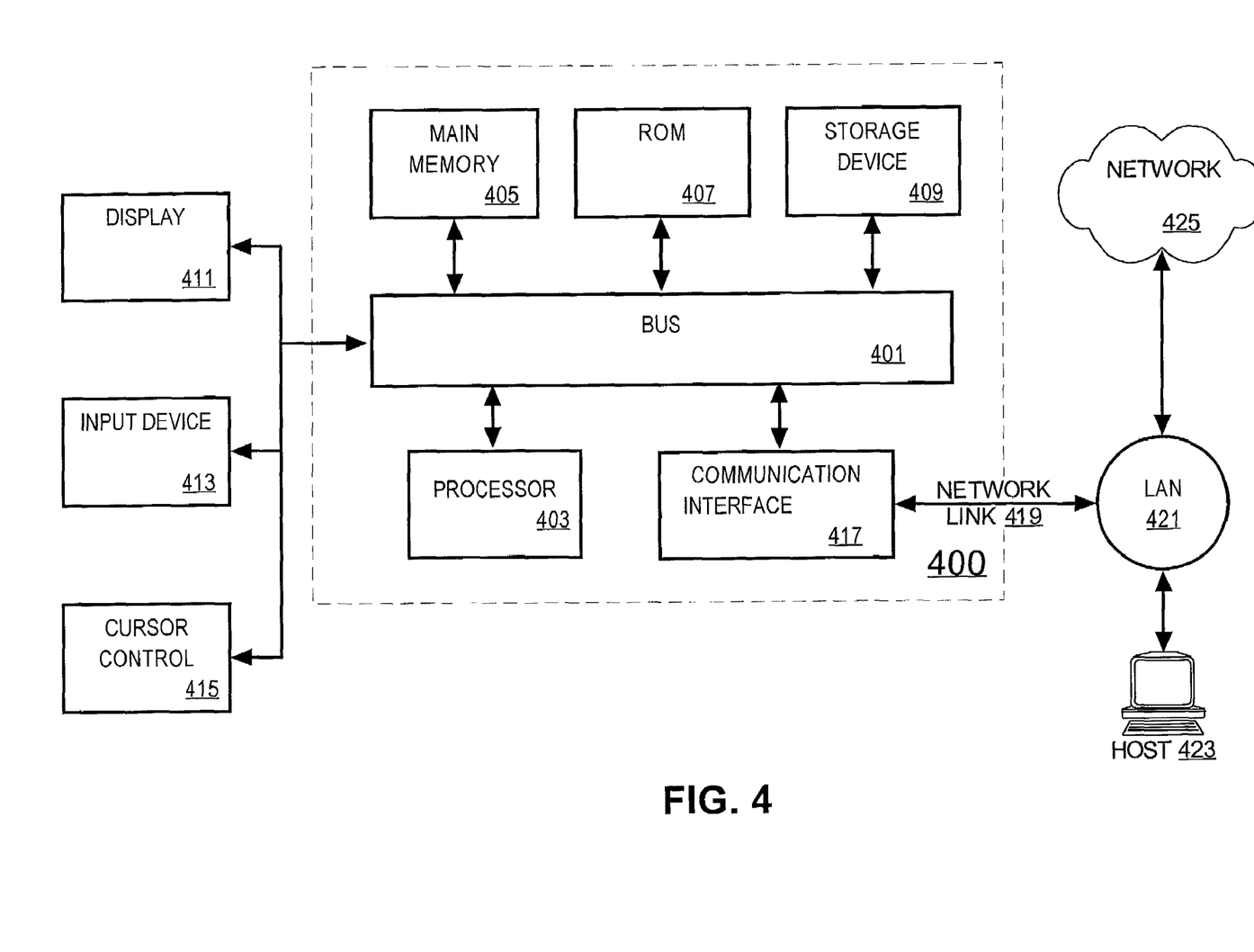
FIG. 4 depicts a computer system that can be used to implement an embodiment of the present invention.

FIG. 4 illustrates a computer system 400 upon which an embodiment according to the present invention can be implemented. The computer system 400 includes a bus 401 or other communication mechanism for communicating information, and a processor 403 coupled to the bus 401 for processing information. The computer system 400 also includes main memory 405, such as a random access memory (RAM) or other dynamic storage device, coupled to the bus 401 for storing information and instructions to be executed by the processor 403. Main memory 405 can also be used for storing temporary variables or other intermediate information during execution of instructions to be executed by the processor 403. The computer system 400 further includes a read only memory (ROM) 407 or other static storage device coupled to the bus 401 for storing static information and instructions for the processor 403. A storage device 409, such as a magnetic disk or optical disk, is additionally coupled to the bus 401 for storing information and instructions.

The computer system 400 may be coupled via the bus 401 to a display 411, such as a cathode ray tube (CRT), liquid crystal display, active matrix display, or plasma display, for displaying information to a computer user. An input device 413, such as a keyboard including alphanumeric and other keys, is coupled to the bus 401 for communicating information and command selections to the processor 403. Another type of user input device is cursor control 415, such as a mouse, a trackball, or cursor direction keys for communicating direction information and command selections to the processor 403 and for controlling cursor movement on the display 411.

According to one embodiment of the invention, synchronous change data capture is provided by the computer system 400 in response to the processor 403 executing an arrangement of instructions contained in main memory 405. Such instructions can be read into main memory 405 from another computer-readable medium, such as the storage device 409. Execution of the arrangement of instructions contained in main memory 405 causes the processor 403 to perform the process steps described herein. One or more processors in a multi-processing arrangement may also be employed to execute the instructions contained in main memory 405. In alternative embodiments, hard-wired circuitry may be used in place of or in combination with software instructions to implement the embodiment of the present invention. Thus, embodiments of the present invention are not limited to any specific combination of hardware circuitry and software.

The computer system 400 also includes a communication interface 417 coupled to bus 401. The communication interface 417 provides a two-way data communication coupling to a network link 419 connected to a local network 421. For example, the communication interface 417 may be a digital subscriber line (DSL) card or modem, an integrated services digital network (ISDN) card, a cable modem, or a telephone modem to provide a data communication connection to a corresponding type of telephone line. As another example, communication interface 417 may be a local area network (LAN) card (e.g. for Ethernet™ or an Asynchronous Transfer Model (ATM) network) to provide a data communication connection to a compatible LAN. Wireless links can also be implemented. In any such implementation, communication interface 417 sends and receives electrical, electromagnetic, or optical signals that carry digital data streams representing various types of information. Further, the communication interface 417 can include peripheral interface devices, such as a Universal Serial Bus (USB) interface, a PCMCIA (Personal Computer Memory Card International Association) interface, etc.

The network link 419 typically provides data communication through one or more networks to other data devices. For example, the network link 419 may provide a connection through local network 421 to a host computer 423, which has connectivity to a network 425 (e.g. a wide area network (WAN) or the global packet data communication network now commonly referred to as the "Internet") or to data equipment operated by a service provider. The local network 421 and network 425 both use electrical, electromagnetic, or optical signals to convey information and instructions. The signals through the various networks and the signals on network link 419 and through communication interface 417, which communicate digital data with computer system 400, are exemplary forms of carrier waves bearing the information and instructions.

The computer system 400 can send messages and receive data, including program code, through the network(s), network link 419, and communication interface 417. In the Internet example, a server (not shown) might transmit requested code belonging to an application program for implementing an embodiment of the present invention through the network 425, local network 421 and communication interface 417. The processor 403 may execute the transmitted code while being received and/or store the code in storage device 409 or other non-volatile storage for later execution. In this manner, computer system 400 may obtain application code in the form of a carrier wave.

The term "computer-readable medium" as used herein refers to any medium that participates in providing instructions to the processor 403 for execution. Such a medium may take many forms, including but not limited to non-volatile media, volatile media, and transmission media. Non-volatile media include, for example, optical or magnetic disks, such as storage device 409. Volatile media include dynamic memory, such as main memory 405. Transmission media include coaxial cables, copper wire, and fiber optics, including the wires that comprise bus 401. Transmission media can also take the form of acoustic, optical, or electromagnetic waves, such as those generated during radio frequency (RE) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistance (PDA) and a laptop. An infrared detector on the portable computing device receives the information and instructions borne by the infrared signal and places the data on a bus. The bus conveys the data to main memory, from which a processor retrieves and executes the instructions. The instructions received by main memory may optionally be stored on storage device either before or after execution by processor.

CONCLUSION

Accordingly, embodiments of synchronous change data capture are described that address the problems of maintaining strict and correct transaction ordering, which prior solutions have not been able to achieve. Furthermore, prior solutions also required post-processing or updates to many rows of the change table after the data was originally captured to record an approximate ordering of rows in the change table itself, an operation that was prohibitively expensive in prior solutions, and increased by an order of N, where N is the number of rows in the change table.

The major utility of a change table is that it can capture all changes omitting none, and that it can record the order in which all operations were performed. It is the second part, order of operations, in which the prior art lacked a solution but which is solved by embodiments of the present invention.

While the present invention has been described in connection with a number of embodiments and implementations, the present invention is not so limited but covers various obvious modifications and equivalent arrangements, which fall within the purview of the appended claims.

What is claimed is:

1. A method for synchronous change data capture, comprising the steps of:
   generating a transaction identifier for each transaction in a plurality of transactions that uniquely identifies each transaction;
   for each operation in a transaction, recording change data for the operation, transaction identifier for the transaction, and an identifier to identify a relative ordering of each operation in the transaction in a first database object wherein at least one of the transactions include a plurality of operations;
   during a commit of the transaction, recording the transaction identifier and a system change number in a second database object, wherein the system change number indicates a timing of the commit that is later than a previously committed transaction; and
   associating the change data in the first database object with the system change number in the second database object based on the transaction identifier by performing a join operation on the first database object and the second database object, and wherein the join operation puts the change data in the first database into an order based on when the operation for each change data in the first database occurred.

2. A method according to claim 1, further comprising, during the commit of the transaction, the steps of:
   obtaining a concurrency lock;
   after obtaining the concurrency lock, generating the system change number and performing said recording the transaction identifier and the system change number in the second database object, and concluding the commit; and
   after said recording the transaction identifier and the system change number in the second database object, releasing the concurrency lock.

3. A method according to claim 1, wherein the first database object comprises a change table and the second database object comprises a transaction table.

4. A computer program product having a computer readable storage medium storing instructions for synchronous change data capture executable by a process for performing the steps of method according to claim 1.

5. A method for processing synchronously captured change data, comprising:
   accessing a first database object comprising change data for each operation in a plurality of operations performed within each transaction in a plurality of transactions, a transaction identifier that uniquely identifies each transaction in the plurality of transactions and the plurality of operations performed within each transaction, and an identifier to identify a relative ordering of each operation in the transaction;
   accessing a second database object comprising a first transaction identifier and a first system change number; and
   associating the change data in the first database object with the first system change number in the second database object based on the first transaction identifier by performing a join operation on the first database object and the second database object, wherein the first system change number is recorded during a commit of the transaction corresponding to the fist transaction identifier and indicates a timing of the commit of the transaction corresponding to the fist transaction identifier that is later than a previously committed transaction, and wherein the join operation puts the change data in the first database into an order based on when the operation for each change data in the first database occurred.

6. A computer program product having a computer readable storage medium storing instructions for synchronous change data capture executable by a process for performing the steps of method according to claim 5.

7. A method for synchronous change data capture, comprising the steps of:
   generating a transaction identifier that uniquely identifies a transaction;
   for each operation in a transaction, recording change data for the operations, the transaction identifier for the transaction, and an identifier to identify a relative ordering of each operation in the transaction in a change table wherein at least one of the transactions include a plurality of operations; and
   during a commit of the transaction, performing the steps of:
   obtaining a concurrency lock;
   after obtaining the concurrency lock, generating a system change number indicating a timing of the commit of the transaction that is later than a previously committed transaction and recording the transaction identifier and the system change number in a database table;
   after said recording the transaction identifier and the system change number in the second database table, releasing the concurrency lock; and
   associating the change data in the first database object with the system change number in the second database object based on the transaction identifier by performing a join operation on the first database object and the second database object, and wherein the join operation puts the change data in the first database in an order based on when the operation for each change data in the first database occurred.

8. A computer program product having a computer readable storage medium storing instructions for synchronous change data capture executable by a process for performing the steps of method according to claim 7.

9. A method according to claim 7, wherein the system change number indicates an event occurring between said obtaining the concurrency lock and said releasing the concurrency lock.

10. A method according to claim 9, wherein the system change number indicates an event occurring before the commit of the transaction.

11. A method according to claim 7, further comprising generating a commit system change number for the transaction that is later then the system change number.

12. A method according to claim 2, wherein the system change number indicates an event occurring between said obtaining the concurrency lock and said releasing the concurrency lock.

13. A method according to claim 1, wherein the system change number indicates an event occurring before the commit of the transaction.

14. A method according to claim 1, further comprising generating a commit system change number for the transaction that is later then the system change number.

* * * * *